(12) United States Patent (10) Patent No.: US 7,893,953 B2
Krestakos et al. (45) Date of Patent: Feb. 22, 2011

(54) VIDEO CONFERENCING LIGHTING SYSTEM

(75) Inventors: Robert G. Krestakos, Byron Center, MI (US); Matthew A. Mead, Grand Rapids, MI (US); Joel Stanfield, Kentwood, MI (US); Carl V. Forslund, III, Grand Rapids, MI (US); Joseph R. Branc, Grand Rapids, MI (US)

(73) Assignee: Steelcase Development Corporation, Grand Rapids, MI (US)

( * ) Notice: Subject to any disclaimer, the term of this patent is extended or adjusted under 35 U.S.C. 154(b) by 1283 days.

(21) Appl. No.: 11/424,967

(22) Filed: Jun. 19, 2006

(65) Prior Publication Data

US 2007/0291466 A1 Dec. 20, 2007

(51) Int. Cl.
*H04N 7/14* (2006.01)
(52) U.S. Cl. .............. 348/14.01; 348/14.08; 348/14.09; 362/33
(58) Field of Classification Search ... 348/14.01–14.16; 379/309, 274; 463/12, 13, 40, 46, 25; 362/217.01–217.09, 362/217.1, 223, 282
See application file for complete search history.

(56) References Cited

U.S. PATENT DOCUMENTS

| | | | |
|---|---|---|---|
| 2002/0110376 A1* | 8/2002 | MacLean et al. | 396/429 |
| 2003/0219237 A1* | 11/2003 | Bastasz et al. | 386/128 |
| 2004/0070149 A1 | 4/2004 | Lipscomb et al. | |
| 2005/0024484 A1* | 2/2005 | Leonard et al. | 348/14.01 |
| 2005/0093241 A1* | 5/2005 | Lipscomb et al. | 273/309 |
| 2005/0248651 A1* | 11/2005 | Hirata et al. | 348/14.08 |
| 2006/0017805 A1* | 1/2006 | Rodman | 348/14.02 |
| 2006/0109199 A1* | 5/2006 | Yee et al. | 345/1.3 |
| 2007/0173394 A1* | 7/2007 | Lee | 493/68 |
| 2007/0274700 A1* | 11/2007 | Dalby et al. | 396/178 |

* cited by examiner

*Primary Examiner*—Melur Ramakrishnaiah
(74) *Attorney, Agent, or Firm*—Quarles & Brady LLP

(57) ABSTRACT

A system for lighting at least one individual positioned about a piece of furniture during a video recording process includes a piece of furniture having a work surface and at least one non-work surface. A lighting source is arranged along either the work surface or the non-work surface of the piece of furniture to project non-visible light away from the piece of furniture toward an individual positioned proximate to the piece of furniture to light the individual or recording during a video recording process.

30 Claims, 3 Drawing Sheets

VIDEO CONFERENCING LIGHTING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention is related to a system and method for lighting individuals during video or filming applications and, more particularly, to a lighting system that includes a light designed and positioned to improve lighting of an object during video conference.

Video recording procedures are being implemented in a variety of non-traditional environments (i.e. outside of television and film studios). For example, offices often employ video conference systems and the like. Whenever video recording procedures are performed outside of studios or other environments that have been specifically designed for video recording, optimally lighting the object of the video recording process can be a rather arduous and time consuming process that is often foregone.

With respect to video conferencing in an office environment, proper lighting may be virtually unachievable or individuals skilled in achieving proper lighting may be unavailable. Accordingly, a video conference may be held where individuals partaking in the video conference or objects used during the video conference are incorrectly lighted. For example, as is common in an office environment where a camera is often positioned to record individuals seated at a conference table or standing at a podium, the majority of light shown on a given individual may be provided by over-head lights. As such, shadows are typically cast by the hair or formed under the eyes, nose, and chin, resulting in poor image quality.

To correct for such lighting conditions, a lighting source must be positioned in front of the person(s) being imaged and, preferably, aligned to shine up onto each persons face to adequately light the areas of the face cast into shadow by the over-heard lights. Unfortunately, frontally positioned lighting is often impractical for a number of reasons. First, as suggested by the label, frontally positioned lighting must be located in front of the face of a person being imaged, which would often interfere with or obscure the recording process, or, otherwise, require significant preparations. In the case of video conferencing where subjects of a conference are positioned around a conference table, as is quite common, each person seated at the conference table would require an associated lighting source that is correctly positioned for the seating position of each person as well as the location of the camera with respect to the individual, which is impractical. Second, even if properly located so as to direct adequate lighting toward each person from a position that does not interfere with the recording process, the lighting would be focused into the eyes of each person, which would result in squinting and generally uncomfortable working conditions.

Therefore it would be desirable to have a system and method for quickly and easily lighting the object imaged via a video process when recording is conducted in non-traditional recording environments (i.e. recording studios) employing lighting, such as over-head lighting, that is undesirable for video recording. In particular, it would be desirable to have a system and method for correctly lighting individuals during a video conferencing process without requiring undue preparation, interfering with the field of view shown during the video conference, or creating uncomfortable working environments due to lights directed into the faces of those being imaged during a video process.

SUMMARY OF THE INVENTION

The present invention overcomes the aforementioned drawbacks by providing a lighting source that emits light outside of the visual range to light an object being imaged via a video process. In this regard, the lighting source emits light that is readily detectable by traditional, commercially available, video recording systems, but that is undetectable by individuals lighted by the light source. Accordingly, the light source may project light to correctly light an individual positioned before the video recording system without causing the individual discomfort. As such, the light source may be pre-positioned to correctly light individuals positioned before the video system by integrating the light source with the surrounding environment.

In accordance with one aspect of the invention, a system for lighting at least one individual positioned about a piece of furniture during a video recording process is disclosed. The lighting system includes a piece of furniture having a work surface and at least one non-work surface. A lighting source is arranged along either the work surface or the non-work surface of the piece of furniture to project non-visible light away from the piece of furniture toward an individual positioned proximate to the piece of furniture to light the individual for recording during a video recording process.

In accordance with another aspect of the invention, a system for lighting at least one individual positioned about a piece of furniture during a video recording is disclosed. The lighting system includes a piece of furniture having at least one substantially planar surface. A light source is arranged along the substantially planar surface of the piece of furniture and is configured to emit non-visible light. The non-visible light is directed away from the piece of furniture toward an individual positioned proximate to the piece of furniture to light the individual for recording in a video recording process.

In accordance with yet another aspect of the invention, a video teleconferencing system is disclosed that includes a piece of furniture configured to present a work surface for an individual positioned proximate thereto. A video conferencing device is partially supported by the piece of furniture. An infrared lighting source is supported by either the piece of furniture or the video conferencing device and is configured to project infrared light onto the individual to light the individual during a video teleconferencing process.

Various other features of the present invention will be made apparent from the following detailed description and the drawings.

DETAILED DESCRIPTION OF THE INVENTION

Figure 1A:
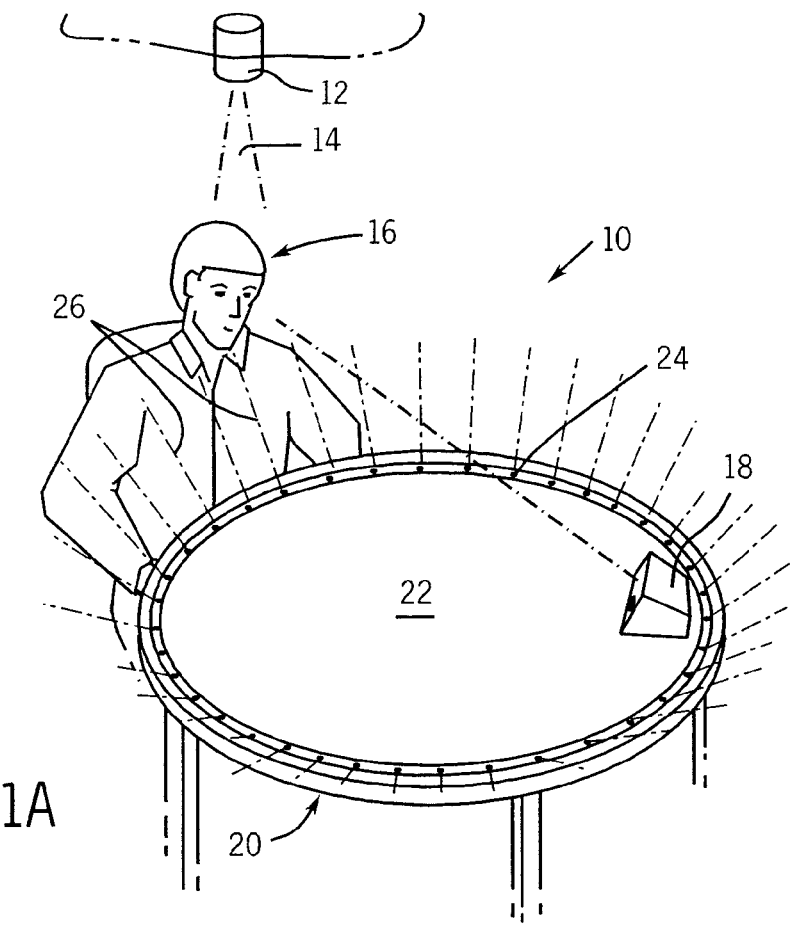
FIG. 1a is a perspective view of a traditional work environment including a video recording lighting system in accordance with at least one embodiment of the present invention.

Referring to FIG. 1a, a traditional work or office environment 10 including over-head lighting 12 projects a beam of light 14 downward onto an individual 16 positioned for recording by a video recording system 18 and, in particular, a video teleconferencing system. As is commonplace in numerous work environments 10, the individual 16 is seated at a desk or table 20. In this regard, a beam of light 14 projected by the over-head light 12 is ideal for lighting a work surface 22 of the desk 20. However, as described above, while ideal for lighting the work surface 22, the beam of light 14 projected downward from the over-head lighting source 12 will create numerous shadowed areas in and about the face and upper body of the individual 16. Thus, when the individual 16 is being recorded by the video recording system 18, an undesirable image having numerous shadows that obscure the individual will be captured for video teleconferencing using the video recording system 18.

To overcome these undesirable conditions, the present invention provides a lighting source 24 designed to correctly light the individual 16 for video recording. In particular, according to at least one embodiment, the lighting source 24 is designed to compensate for the beam of light 14 projected downward onto the individual 16 by the over-head light 12. Specifically, by positioning the lighting source 24 below the face of the individual 16 when seated at the table 20, the individual 16 is lit from below to project a beam of light 26 onto the areas that would otherwise be cast into shadow by the over-head light 12.

As show in FIG. 1a, it is contemplated that the lighting source 24 may form a ring encircling a parameter of the table 20 to project the beam of light 26 radially from the table 20 toward individuals seated thereabouts.

Figure 1B:
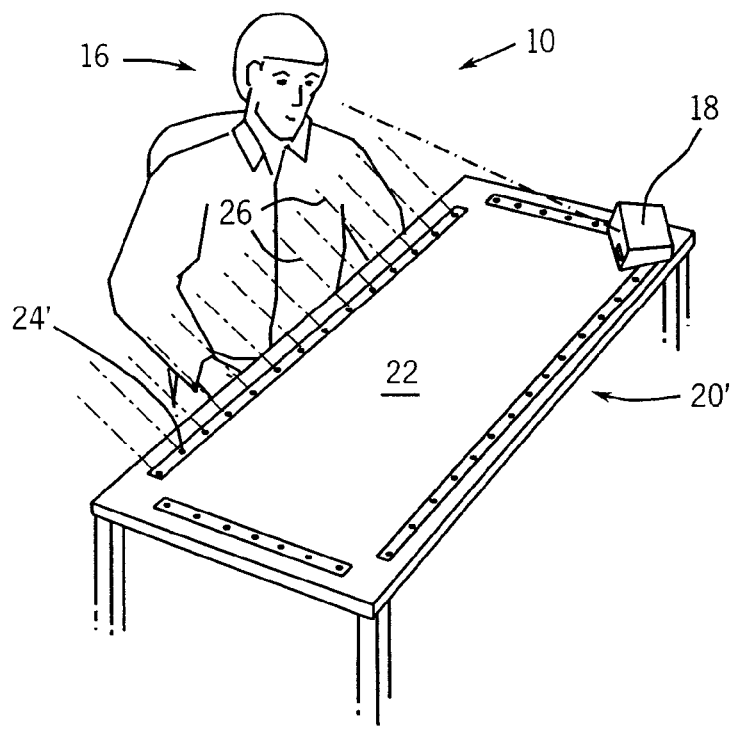
FIG. 1b is a perspective view of a rectangular conference table having a clustered lighting system in accordance with one embodiment of the present invention.

The lighting source 24 may be formed using a plurality of individual lights. For example, it is contemplated that the lighting source 24 may be formed from a plurality of light emitting diodes (LEDs). In this regard, the individual lights in the lighting source 24 may be arranged in the ring encircling the parameter of the table 20 at substantially even intervals. On the other hand, referring to FIG. 1b, it is also contemplated that the lighting source 24 may be clustered about specific areas around a table 20. For example, in the case of a rectangular table 20', it is contemplated that the lighting source 24' may be clustered along the central areas of each side, where individuals are more likely to be seated.

Referring again to FIG. 1a, it is contemplated that the beam of light 26 projected by the lighting source 24 is outside the visual range of the individual 16. That is, it is contemplated that the beam of light 26 may be outside of the visual spectrum of light extending from approximately 380 nanometers (nm) to approximately 750 nm. For example, it is contemplated that the beam of light 26 may be in the near infrared range, approximately 700 or 750 nm to approximately 780 or 800 nm, or in the infrared range, greater than approximately 780 nm.

Accordingly, the beam of light 26 will not be detectable by the individual 16, but will serve to adequately light the individual 16 with respect to the video recording system 18. That is, since most traditional video recording cameras are capable of capturing light outside of the visual range, for example, infrared light, and do not distinguish between these light types, the viewable video provided from the video recording system 18 will show the individual 16 as being lighted (with visible light) by both beams of light 14, 26.

Therefore, numerous advantages can be realized. For example, since the beam of non-visible light 26 emitted by the light source 24 positioned below the individual 16 is undetectable by the individual 16, the beam of light 26 does not interfere with the individual 16 by shining into the eyes, obscuring the individual's view, or otherwise providing the individual 16 with an uncomfortable work environment 10.

Additionally, since the lighting source 24 emits light that is readily detectable by traditional, commercially available, video recording systems, it is widely useable and does not require any specially designed video conferencing systems. Rather, it can be readily used with most traditional video recording systems 18.

Furthermore, the light source 24 may be pre-positioned to correctly light the individual 16 positioned before the video recording system 18 by integrating the light source 24 with the surrounding environment 10. For example, as shown in FIG. 1a, the light source 24 may be integrated into the table 20. In particular, the light source 24 may be integrated into the top work surface 22 of the table 20 or other areas about the work environment 10 so as to project the beam of light 26 along a trajectory designed to correctly light the individual 16 for video recording.

Furthermore, the light source 24 may be configured to operate in concert with the video recording system 18. For example, it is contemplated that the light source 24 may be configured to turn "on" or "off" based on whether the camera is currently recording or on standby. Furthermore, it is contemplated that by coordinating operational feedback between the light source 24 and the video recording system 18, the intensity of the light source 24 may be controlled based on the focus or results of the video recording process. For example, by providing feedback regarding the current focus and white-balance of the video recording system 18 specific lights in the lighting system 24 may be turn "on" or "off" or the intensity of such lights may be adjusted to improve the lighting conditions and the resulting recordings. Additionally, as will be described, it is contemplated that feedback may be provided to individuals using the lighting system 24 to indicate when light is being emitted and whether the user is optimally positioned for lighting.

Figure 2:
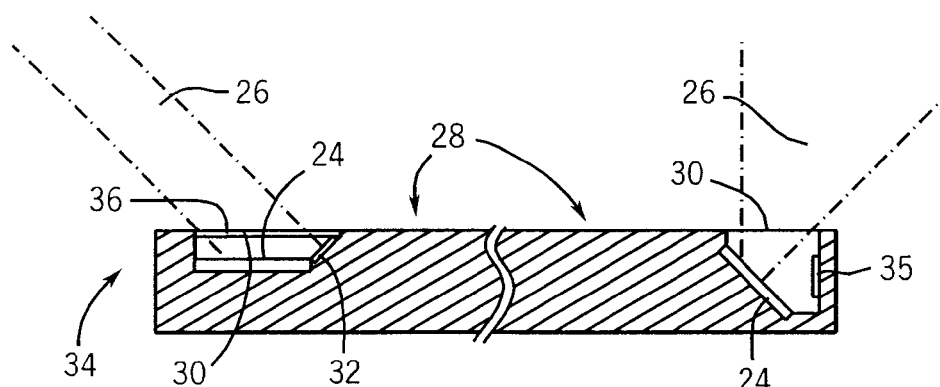
FIG. 2 is a cross-sectional view of a portion of a desk incorporating a video recording lighting system in accordance with another embodiment of the present invention.

Referring to FIG. 2, the light source 24 may be integrated into a planar surface 28 such as are commonly found in tabletops, chairs, or other pieces of furniture. In the case of a planar surface 28, it is contemplated that the light source 24 may be disposed below the planar surface 28 and encased under a cover 30 so that the planar surface 28 is unbroken by the light source 24. In this regard, as will be described, the light source 24 can be pre-positioned to correctly light an individual seated to work at the planar surface 28, but will not interfere with the field of view positioned to record the individual during a video teleconferencing or other video recording process.

It is contemplated that the light source 24 may be angled below the planar surface 28 so that the beam of light 26 emitted by the light source 24 is projected away form the planar surface 28 at an angle designed to adequately light an individual seated proximate to the planar surface 28. The angled arrangement extending below the planar surface 28 can be configured to emit the beam of light 26 at an angle designed to compensate for overhead lights and the shadows created by such lighting arrangements. Accordingly, the light source 24 may project a beam of light 26 to correctly light an individual positioned before a video recording system even when over-head lights are the dominate light source in the area.

Additionally or alternatively, it is contemplated that reflectors, refractors, filters, or dispersion layers may be coupled with the light source 24. For example, it is contemplated that a reflector 32 may be positioned proximate to the light source 24 to reflect the beam of light 26 emitted by the light source 24 along the trajectory desired to adequately light an individual seated at the planar work surface 28. Accordingly, the angled mounting described above may be foregone in favor of reflectors 32 positioned to reflect the beam of light radially toward an edge 34 of the work surface 28, where individuals would be seated. To further aid in lighting individuals seated about the work surface 28, a filter or dispersion layer 36 may be formed over the cover 30 such that the beam of light 26 is substantially evenly distributed around the edge 34 of the work surface 28.

Furthermore, since lighting source 24 emits a beam of light 26 outside of the visual range, the beam of light 26 will not be perceived by an individual and; hence, will not cause the individual to squint or be otherwise uncomfortable. Accordingly, the light source 24 emits a beam of light 26 that is readily detectable by traditional, commercially available, video recording systems to improve the quality of image gathered by the video recording systems without adversely affecting the individuals lighted by the light source.

It is also contemplated that one or more sensors 35 may be arranged about the light source 24 to detect an overall intensity of the light emitted by the light source 24. As described above, the feedback received from the sensor 35 may be used to coordinate portions of the light system 24 with operation of a camera used in the video recording process. However, it is also contemplated that feedback from the sensor 35 may be used to determine when the beam of light 26 emitted by the light source 24 is being reflected, such as by work materials resting on the work surface 28. Accordingly, one or more visual or audio indicators may be included to indicate to a user that the light source 24 is being blocked or impeded. That is, since it is preferable that the light source 24 emit light that is outside of the visual range, such visual or audio indicators may be included to alert a user to conditions that might interfere with proper lightings.

Figure 3:
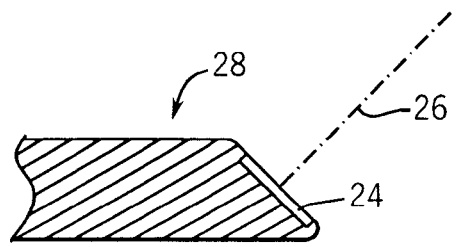
FIG. 3 is a cross-sectional view of another desk incorporating a video recording lighting system in accordance with another embodiment of the present invention.

Referring now to FIG. 3, it is contemplated that the light source 24 may also be integrated into a beveled edge 37 extending from a planar work surface 28 of a piece of furniture. In this regard, it is contemplated that the beveled edge may be configured to extend from the planar work surface 28 at an angle designed to cast the beam of light 24 at an angle pre-configured to light an individual seated proximate to the planar work surface 28. That is, in a manner similar to the angled mounting described with respect to FIG. 2, the light source 24 can be mounted at an angle by being disposed along the planar surface forming beveled edge 37. Accordingly, the light source 24 may project a beam of light 26 to correctly light an individual positioned before a video recording system even when over-head lights are the dominate light source in the area. Furthermore, it is contemplated that reflectors 32, refractors filters, or dispersion layers 36 may be coupled with the light source 24.

Figure 4:
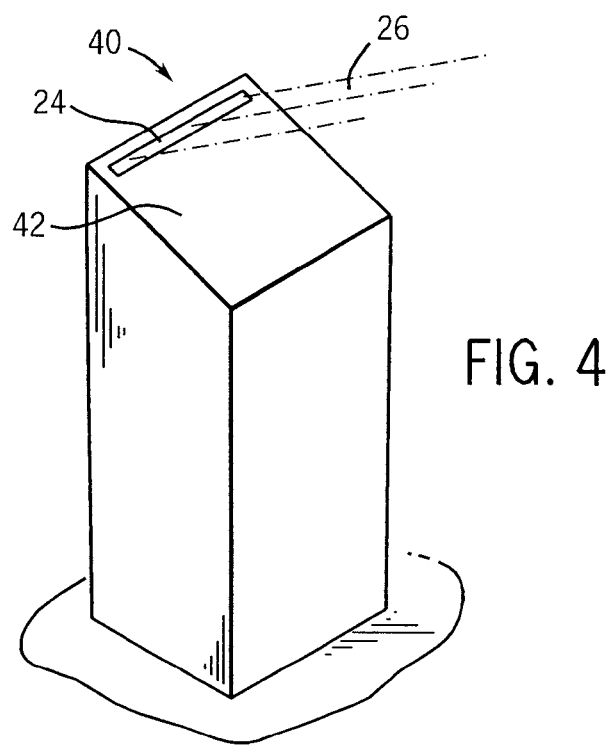
FIG. 4 is a perspective view of a podium incorporating a video recording lighting system in accordance with yet another embodiment of the present invention.
Figure 5:
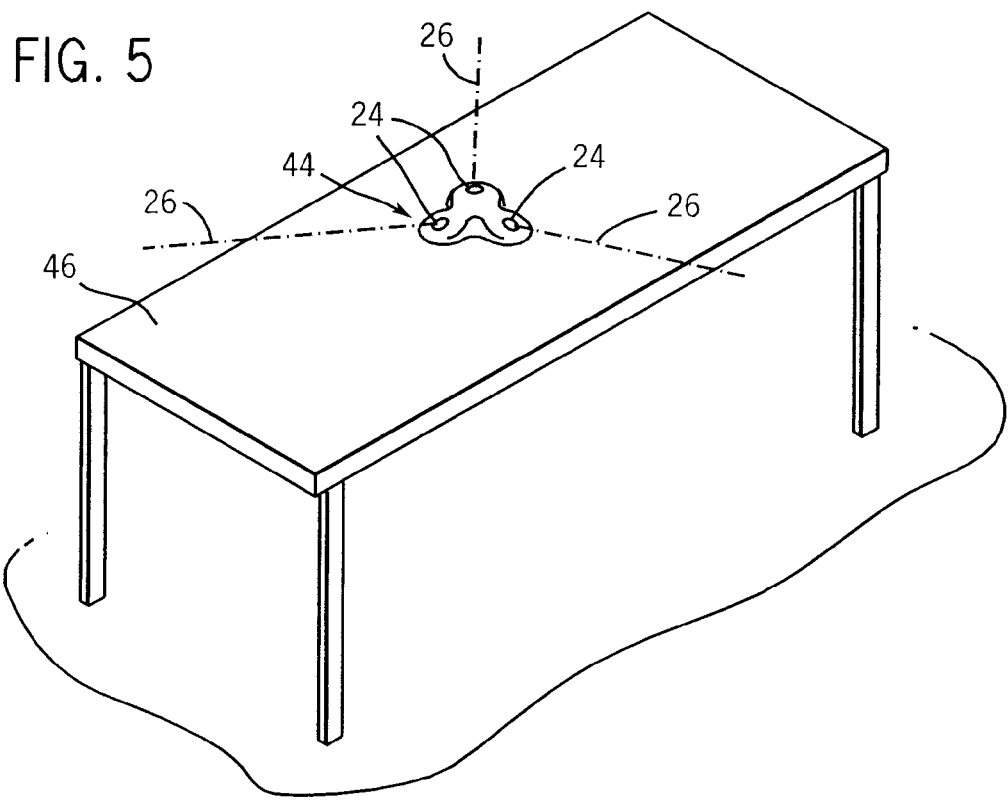
FIG. 5 is a perspective view of a portable video conferencing lighting system in accordance with still another embodiment of the present invention.
Figure 6:
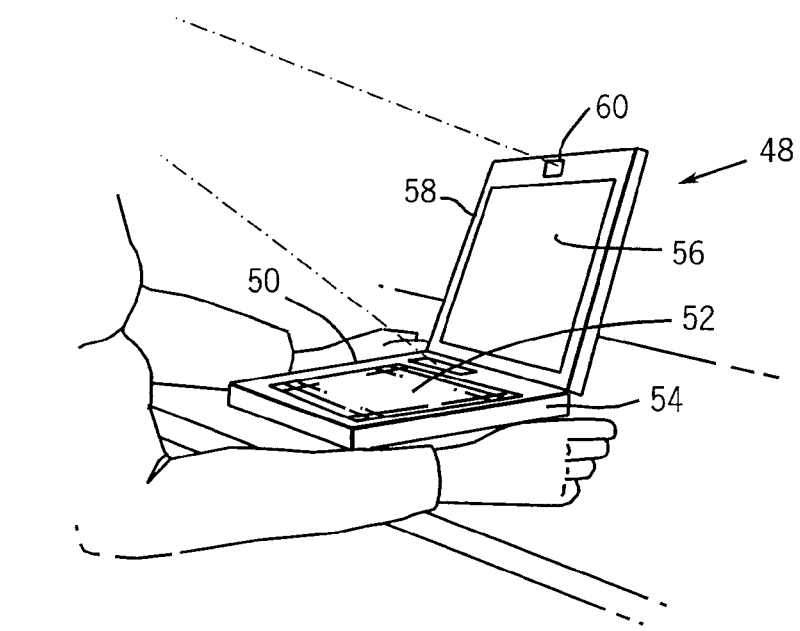
FIG. 6 is a perspective view of a personal computer incorporating a video recording lighting system in accordance with one other embodiment of the present invention.

Referring now to FIGS. 4-6, it is contemplated that the lighting systems described with respect to FIGS. 2 and 3 may be incorporated into a wide variety of furniture or devices. For example, referring to FIG. 4, it is contemplated that the light source 24 may be incorporated into a podium 38 so as to project the beam of light 26 to light an individual standing at the podium 38. The light source 24 may be aligned along an upper end 40 of a planar surface 42 of the podium 38. In this regard, the light source 24 may project a beam of light 26 to correctly light an individual standing at the podium 38 and being recorded by a video recording system, even when overhead lights are the dominate light source in the area.

In other embodiments, although not illustrated, the light source 24 may be positioned along a front edge of the podium 38 or along one or both lateral edges and aligned to project light along trajectories toward the location at which a podium user would stand. That is, the light source 24 may be positioned at any of a wide variety of positions so long as the locations for the light source(s) are select so that when a podium user places presentation materials on a top surface of the podium 38, the materials are unlikely to block or impede the projected light.

Furthermore, referring to FIG. 5, it is contemplated that the light source 24 may be incorporated within a portable device or part of a component of a video conferencing system. As shown, the portable device may be a speakerphone unit 44 or any other device, standalone or otherwise. In the case of a speakerphone 44, in at least some embodiments, the light source 24 will be naturally positioned proximate to an individual desiring to use the speakerphone 44. As is common in the environment of a conference room having a conference table 46, the speakerphone 44 will be positioned in the center of the conference table 46. Accordingly, the speakerphone is positioned to receive audio projected from individuals seated about the conference table and the light source 24 is positioned to project the beam of light 26 from the speakerphone 44 radially toward the individuals seated about the conference table 46.

Referring now to FIG. 6, it is also contemplated that the lighting systems described above may be incorporated into other devices such as a computer 48. As shown, the computer 48 may be a laptop computer, but the present invention is equally applicable with non-laptop computer designs. As is common, the computer 48 includes a computer housing 50 at the top of which is a keyboard 52 surrounded by a bezel or housing 54. Extending up from the housing 54 is a display 56 that is also surrounded by a bezel or housing 58. The light source 24 may be incorporated directly into the computer 48 so as to adequately light an individual seated before the computer 48 when using the computer 48 as a video conferencing system that includes a camera 60.

Accordingly, it is contemplated that the light source 24 may be disposed in the housing 54 surrounding the keyboard 52 proximate to the display 56 so that the light source 24 is not obscured when the keyboard 52 is used. It is contemplated that the light source 24 may be disposed within the housing 54 surrounding the keyboard 52 and angled, as described with respect to FIGS. 2 and 3, to project a beam of light 26 to correctly light an individual positioned before the computer 48 even when over-head lights are the dominate light source in the area. Additionally or alternatively, it is contemplated that the light source 24 may be disposed in the housing 58 surrounding the display 56 near the camera 60.

Additionally, regardless of the specific device or furniture within which the light source 24 is arranged, it is contemplated that the light source 24 may be housed in any of a variety of materials. For example, various plastics and glasses may be used to house the light source 24. In fact, the housing materials may be selected to match or complement the materials forming the device or furniture within which the light source 24 has been integrated. In this regard, the light source may be seamlessly integrated or may appear as a decorative inlay formed in the device or furniture. Furthermore, even when light is being emitted by the light source 24, since the light emitted by the light source 24 is preferably outside of the range, individuals using the device or seated at the furniture, will not be drawn to distinguish the light source 24 from the device or furniture. In this regard, as previously described, it is contemplated that various forms of feedback may be provided to the user to indicate that light is being emitted or that materials are blocking or impeding the light being emitted by the light source 24 so that a user can make adjustments as necessary.

Therefore, the above-described invention provides a system and method for quickly and easily lighting the focus of a video process when recording is conducted in non-traditional recording environments (i.e. recording studios) employing lighting, such as over-head lighting, that is undesirable for video recording. In particular, a system and method is provided for correctly lighting individuals during a video conferencing process without requiring undue preparation, interfering with the field of view shown during the video conference, or creating uncomfortable working environments due to lights directed into the faces of those positioned on camera.

The present invention overcomes the drawbacks present in prior art systems by providing a lighting source that emits light outside of the visual range to light the focus of a video process. In this regard, the lighting source emits light that is readily detectable by traditional, commercially available, video recording systems, but that is undetectable by individuals lighted by the light source. Accordingly, the light source may project light to correctly light an individual positioned before the video recording system without causing the individual discomfort. As such, the light source may be pre-positioned to correctly light individuals (for example, to correct for over-head lights) positioned before the video system by integrating the light source with the surrounding environment, such as furniture pieces, portions of the video conferencing system, or portable devices like computers and speakerphones.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A system for lighting at least one individual positioned about a piece of furniture during a video recording process comprising:
    a piece of furniture having a work surface and at least one non-work surface; and
    a lighting source arranged along at least one of the work surface and the non-work surface of the piece of furniture to project non-visible light away from the piece of furniture toward an individual positioned proximate to the piece of furniture to light the individual for recording during a video recording process.

2. The system of claim 1 wherein the piece of furniture includes at least one of a desk and a podium and wherein the lighting source is arranged along at least one of the work surface and a beveled edge extending from the work surface.

3. The system of claim 1 wherein the lighting source is configured to emit infrared light.

4. The system of claim 1 wherein the lighting source includes light emitting diodes configured to emit light in a non-visible range.

5. The system of claim 1 wherein the work surface includes a peripheral edge and the non-work surface extends from the peripheral edge and wherein the lighting source extends along at least a portion of the at least one of the work surface and the non-work surface proximate to the peripheral edge.

6. The system of claim 5 wherein the lighting source extends along substantially the entire peripheral edge.

7. The system of clam 6 wherein the lighting source is arranged along at least one of the work surface and the non-work surface.

8. The system of claim 7 wherein the light source includes a plurality of individual lights arranged in clusters about at least one of the work surface and the non-work surface.

9. The system of claim 7 wherein the light source includes a plurality of individual lights arranged in substantially even intervals about at least one of the work surface and the non-work surface.

10. The system of claim 5 wherein the lighting source is arranged to project light upward and laterally from the peripheral edge.

11. The system of claim 1 wherein the video recording process includes a video teleconference process.

12. The system of claim 1 wherein the piece of furniture includes a conference table, and the lighting source is arranged along a beveled edge extending from the work surface to project light up from the beveled edge into a face of a plurality of individuals seated about the conference table.

13. The system of claim 1 further comprising a diffusing layer formed over the lighting source configured to diffuse light projected from the light source to distribute the light substantially evenly across at least a portion of the individual.

14. The system of claim 13 wherein the diffusing layer includes at least one of a light scattering lens and a filter configured to distribute the light substantially evenly across at least a portion of the individual.

15. The system of claim 1 wherein the piece of furniture includes at least one of a table and a desk having a top surface and wherein the lighting source is embedded within the top surface and configured to project light from the top surface radially outward from the edges of the top surface to light the individual.

16. The system of claim 1 further comprising a sensor configured to determine an intensity of light about the light source to determine if light projected away from the piece of furniture is being impeded.

17. The system of claim 1 wherein the lighting source is arranged along at least one of the work surface and the non-work surface and forms at least one of a decorative inlay in and a seamless continuation of at least one of the wok surface and the non-work surface.

18. A system for lighting at least one individual positioned about a piece of furniture during a video recording process comprising:
    a piece of furniture having at least one substantially planar surface; and
    light source arranged along the substantially planar surface of the piece of furniture configured to emit non-visible light and direct the non-visible light away from the piece of furniture toward an individual positioned proximate to the piece of furniture to light the individual for recording in a video recording process.

19. The system of claim 18 wherein the light source is an infrared light source.

20. The system of claim 18 wherein the piece of furniture includes at least one of a desk, a table, a chair, and a podium and wherein the substantially planar surface extends along a beveled edge having an angle configured to cast the non-visible light emitted by the light source toward a face of the individual to compensate for light emitted from an over-head light positioned above the individual.

21. The system of claim 18 wherein the light source is configured to control the non-visible light based on operations in the video recording process.

22. The system of claim 18 wherein the substantially planar surface forms a top of at least one of a desk and tabletop, and wherein the light source is embedded within the top and configured to project light from the top radially toward edges of the top to light the individual.

23. The system of claim 18 wherein the light source includes at least one of a focusing layer, diffuser, and a filter configured to project the non-visible light toward the individual in a pattern designed to reduce shadows created about the individual by at least one of ambient light and over-head light.

24. The system of claim 18 wherein the video recording process includes a video teleconferencing process.

25. A video teleconferencing system comprising:
a piece of furniture configured to present a work surface for an individual positioned proximate thereto;
a video conferencing device at least partially supported by the piece of furniture; and
an infrared lighting source supported by at least one of the piece of furniture and the video conferencing device, wherein the infrared lighting source is configured to project infrared light onto the individual to light the individual during a video teleconferencing process.

26. The system of claim 25 wherein the video conferencing device includes a computer system having a keyboard, a display, and a computer supported by the piece of furniture and wherein the lighting source is arranged proximate to at least one of a frame surrounding the keyboard, a frame surrounding the display, and a housing surrounding the computer to project infrared light from the computer system onto the individual to light the individual during a teleconferencing process.

27. The system of claim 25 wherein the video conferencing device includes a laptop computer having a display integrated therein and a keyboard, and wherein the infrared lighting source is arranged proximate to an edge of the display extending from the laptop computer and proximate to a camera lens receiving video processed during the video teleconferencing process so that the infrared light projected by the infrared lighting source is directed generally upward from the laptop toward a face of the individual from a position located above a space in which hands of the individual reside during operation of the keyboard.

28. The system of claim 25 wherein the infrared lighting source is arranged in a portable component of the video conferencing device.

29. The system of claim 28 wherein the video conferencing device includes a speakerphone configured to be centrally disposed on the work surface of the piece of furniture and wherein the portable component includes the speakerphone such that, when the portable component is centrally disposed on the work surface, the speakerphone is positioned to receive audio projected from individuals seated about the work surface and the infrared lighting source is positioned to project light from the speakerphone radially toward the individuals seated about the work surface.

30. The system of claim 25 wherein the infrared lighting source is configured to compensate for light projected onto the individual from an over-head light to evenly light the individual during the video teleconferencing process.

* * * * *

UNITED STATES PATENT AND TRADEMARK OFFICE
CERTIFICATE OF CORRECTION

| | | |
|---|---|---|
| PATENT NO. | : 7,893,953 B2 | Page 1 of 1 |
| APPLICATION NO. | : 11/424967 | |
| DATED | : February 22, 2011 | |
| INVENTOR(S) | : Robert G. Krestakos et al. | |

It is certified that error appears in the above-identified patent and that said Letters Patent is hereby corrected as shown below:

Title Page, Item (57)

ABSTRACT, line 8, "individual or recording" should be --individual for recording--.

Column 1, line 47, "over-heard" should be --over-head--.

Column 3, line 45, "show" should be --shown--.

Column 6, line 22, "select" should be --selected--.

Column 7, lines 12-13, "the range" should be --the visual range--.

Column 8, claim 7, line 17, "clam" should be --claim--.

Column 8, claim 17, line 58, "wok" should be --work--.

Column 8, claim 18, line 65, "light" should be --a light--.

Signed and Sealed this
Nineteenth Day of April, 2011

David J. Kappos
*Director of the United States Patent and Trademark Office*